United States Patent
Chiang et al.

(10) Patent No.: US 11,960,451 B2
(45) Date of Patent: Apr. 16, 2024

(54) METHOD, COMPUTER-READABLE MEDIUM AND FILE SYSTEM FOR DEDUPLICATION UTILZING CALCULATION RANGE AND RE-CHUNKING

(71) Applicant: QNAP Systems, Inc., New Taipei (TW)

(72) Inventors: Tsung-Han Chiang, New Taipei (TW); Jing-Wei Su, New Taipei (TW); Chin-Tsung Cheng, New Taipei (TW)

(73) Assignee: QNAP Systems, Inc., New Taipei (TW)

( * ) Notice: Subject to any disclaimer, the term of this patent is extended or adjusted under 35 U.S.C. 154(b) by 24 days.

(21) Appl. No.: 17/521,919

(22) Filed: Nov. 9, 2021

(65) Prior Publication Data
US 2023/0063119 A1    Mar. 2, 2023

(30) Foreign Application Priority Data
Aug. 24, 2021    (TW) ................................. 110131295

(51) Int. Cl.
| G06F 16/17 | (2019.01) |
| G06F 11/34 | (2006.01) |
| G06F 16/174 | (2019.01) |
| G06F 16/18 | (2019.01) |
| G06F 16/182 | (2019.01) |

(52) U.S. Cl.
CPC ...... *G06F 16/1752* (2019.01); *G06F 11/3452* (2013.01); *G06F 16/1844* (2019.01)

(58) Field of Classification Search
CPC ............. G06F 16/1752; G06F 16/1748; G06F 16/1844; G06F 11/3452
See application file for complete search history.

(56) References Cited

U.S. PATENT DOCUMENTS

| 8,712,963 B1 * | 4/2014 | Douglis | H04L 67/1097 |
| | | | 707/633 |
| 2016/0357580 A1 * | 12/2016 | Lyashevsky | G06F 11/3409 |
| 2019/0391878 A1 * | 12/2019 | Mark | G06F 11/1458 |
| 2020/0293498 A1 * | 9/2020 | Vijayan | G06F 16/1744 |

* cited by examiner

*Primary Examiner* — Hares Jami
(74) *Attorney, Agent, or Firm* — Amin, Turocy & Watson, LLP (57) ABSTRACT

A method for deduplication applicable to a file chunked into a plurality of deduplicated chunks is provided and includes: defining a calculation range in the file according to types of the chunks in the file, where the calculation range includes a plurality of consecutive chunks in the file; generating an evaluation value according to the types of the chunks in the calculation range to determine whether to mark the chunks in the calculation range; and re-chunking and deduplicating the marked chunks in the file. A computer-readable medium and a file system corresponding to the method for deduplication are also provided.

18 Claims, 7 Drawing Sheets

METHOD, COMPUTER-READABLE MEDIUM AND FILE SYSTEM FOR DEDUPLICATION UTILZING CALCULATION RANGE AND RE-CHUNKING

BACKGROUND

1. Technical Field

The present disclosure relates to a technique of deduplication, and more particularly, to an optimization of deduplication.

2. Description of Related Art

A conventional file system with deduplication feature usually chunks a file into a plurality of chunks (e.g., data blocks) and then deduplicates the chunks. The so-called deduplication is to store one of the chunks with the same content, and the rest of the chunks with the same content are not stored, and only a pointer is used to point to the stored chunk. For example, an email sent by a company manager to all employees may contain many files with the same content. The above-mentioned deduplication may save a lot of storage spaces.

After the aforementioned chunks are chunked, there may be a remaining stub chunk at the end of each file. In addition, if the contents of a portion of chunks in the file are modified, the file system may re-chunk the modified chunks, and the end of the re-chunked chunks may also generate new stub chunks. The contents of the stub chunks are mostly not identical to other chunks and therefore not beneficial to deduplicate. As such, how to reduce stub chunks to improve the effect of deduplication and save storing space is becoming an urgent issue in the art.

SUMMARY

In view of the aforementioned problems of the prior art, the present disclosure provides a method for deduplication applicable to a file chunked into a plurality of deduplicated chunks. The method for deduplication includes: defining a calculation range in the file according to types of the chunks in the file, where the calculation range includes a plurality of consecutive chunks in the file; generating an evaluation value according to the types of the chunks in the calculation range to determine whether to mark the chunks in the calculation range; and re-chunking and deduplicating the marked chunks in the file.

The present disclosure further provides a computer-readable medium storing instructions to control an electronic device, a computing device, a data storage device, a computer, or a server to execute the aforementioned method for deduplication.

The present disclosure further provides a file system applicable to a computing device or a computer. The file system is configured to execute the aforementioned method for deduplication via a processor.

The method for deduplication, the computer-readable medium and the file system provided by the present disclosure generate an evaluation value according to the types of the chunks in the file and determine whether to re-chunk and deduplicate the chunks according to the evaluation value. Therefore, re-chunking with poor efficiency can be prevented so as to reduce stub chunks, improve the efficiency of deduplication and save storage space.

DETAILED DESCRIPTION OF THE EMBODIMENTS

The following illustrative embodiments are provided to illustrate the present disclosure, these and other advantages and effects can be apparent to those in the art after reading this specification.

Figure 1:
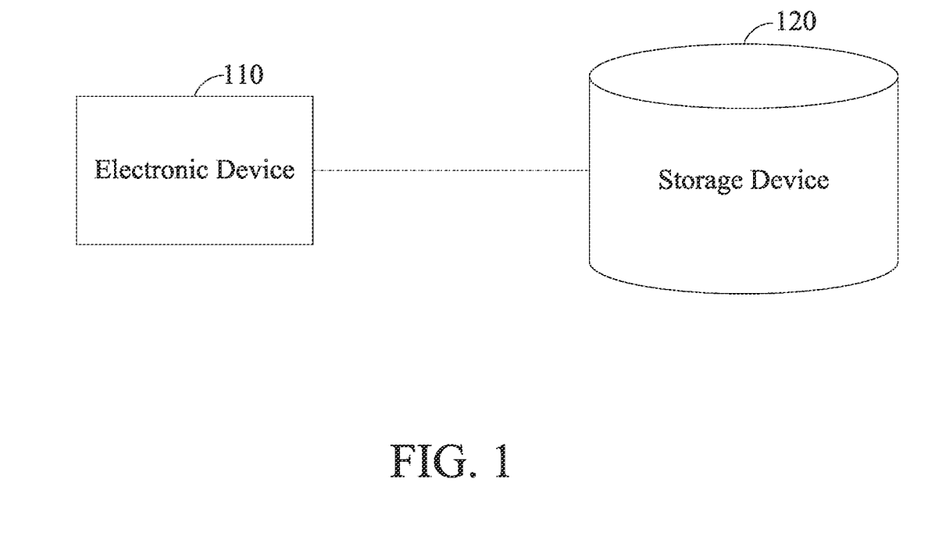
FIG. 1 is a schematic view illustrating an application scenario of a method for deduplication according to an embodiment of the present disclosure.

FIG. 1 is a schematic view illustrating an application scenario of a method for deduplication according to an embodiment of the present disclosure.

In an embodiment, a method for deduplication is applied to an electronic device 110 with a processor. The electronic device 110 is a smart phone, a computer, a server, or other electronic devices or computing devices with data processing capabilities. In addition, the electronic device 110 can also be a local/cloud data storage device or data storage server. The electronic device 110 is connected to a storage device 120 via various networks (e.g., wired network or wireless network). The storage device 120 is another electronic device with a processor located remotely or in the cloud for storing files in a file system. The electronic device 110 reads files in the file system from the storage device 120, and writes a modified file back to the storage device 120.

Figure 2:
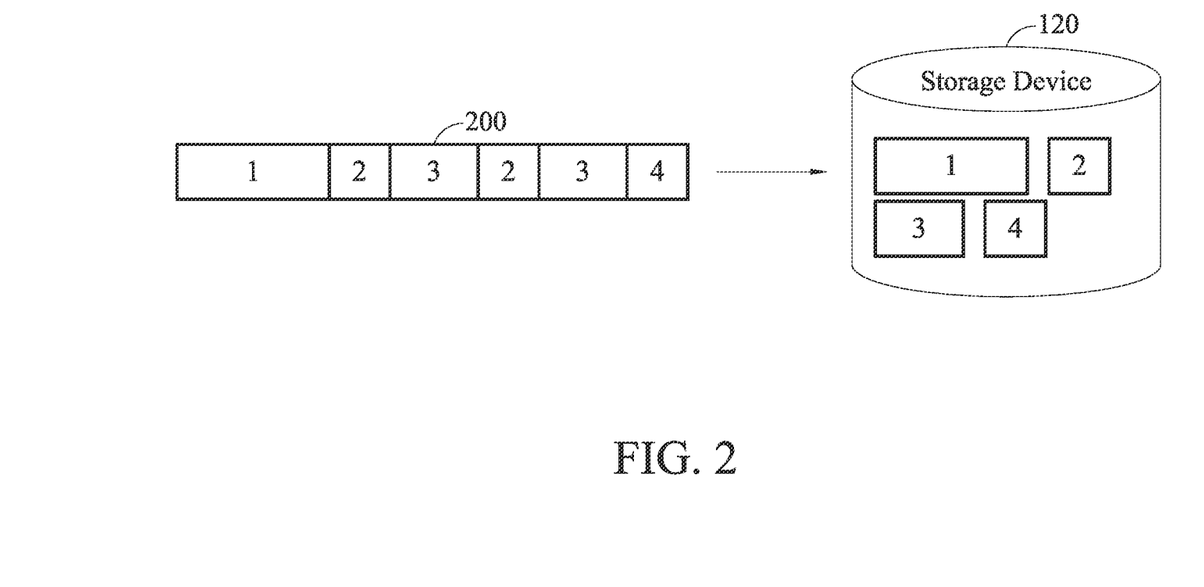
FIG. 2 is a schematic view of a deduplication according to an embodiment of the present disclosure.

FIG. 2 is a schematic view of a deduplication according to an embodiment of the present disclosure. The electronic device 110 chunks a file 200 into six chunks, where these chunks can have a variety of different lengths. The prior art is related to "how to chunk the file into a plurality of chunks with different lengths." For example, rolling hash (also known as recursive hashing or rolling checksum) or other chunking algorithms can be performed according to the data content of the file so as to determine the positions of the chunked chunks.

The first chunk of the file 200 is located on the leftmost side of FIG. 2, and the sixth chunk of the file 200 is located on the rightmost side of FIG. 2. The number in each chunk is the code of the chunk, and the same code represents the same data content. The file 200 has a corresponding file descriptor, in which the code of each chunk of the file 200 is recorded, as shown in Table 1 below. The code of the first chunk of the file 200 is 1; the second chunk and the fourth chunk of the file 200 have the same content, and their codes are both 2; the third chunk and the fifth chunk of the file 200 also have the same content, and their codes are both 3; and the code of the sixth chunk of the file 200 is 4. The electronic device 110 will deduplicate the file 200. Therefore, the storage device 120 only stores four chunks (1, 2, 3, and 4). The file descriptor is stored in the storage device 120. When the electronic device 110 accesses the file 200, the file descriptor is temporarily stored in the electronic device 110. When required, the electronic device 110 can reorganize the file 200 according to the file descriptor.

TABLE 1

| Position Sequence | First | Second, Fourth | Third, Fifth | Sixth |
|---|---|---|---|---|
| Chunk Code | 1 | 2 | 3 | 4 |

Figure 3:
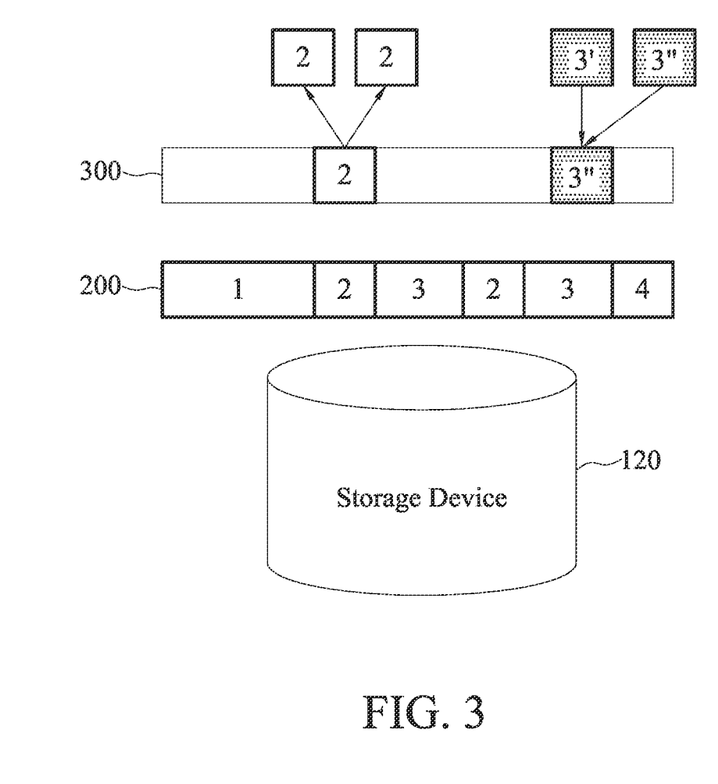
FIG. 3 is a schematic view of a file and a temporary storage area according to an embodiment of the present disclosure.

When the electronic device 110 accesses a file, a temporary storage area can be set in the electronic device 110 to temporarily store chunks required by the electronic device 110 and temporarily store chunks modified by the electronic device 110 so as to prevent frequent transmission of chunks between the electronic device 110 and the storage device 120 that reduces the processing efficiency. For instance, as shown in FIG. 3, the electronic device 110 sets a temporary storage area 300 to temporarily store the chunks of the file 200, where two different application software executed by the electronic device 110 need to read the second chunk 2 of the file 200. Therefore, the electronic device 110 obtains the chunk 2 from the storage device 120 and stores the chunk 2 in the temporary storage area 300 for reading by the application software. In addition, the fifth chunk 3 of the file 200 has been modified twice, resulting in partial chunks 3' and 3" respectively. The partial chunks 3" is generated later, so it covers the partial chunks 3' and is written into the temporary storage area 300.

Figure 4:
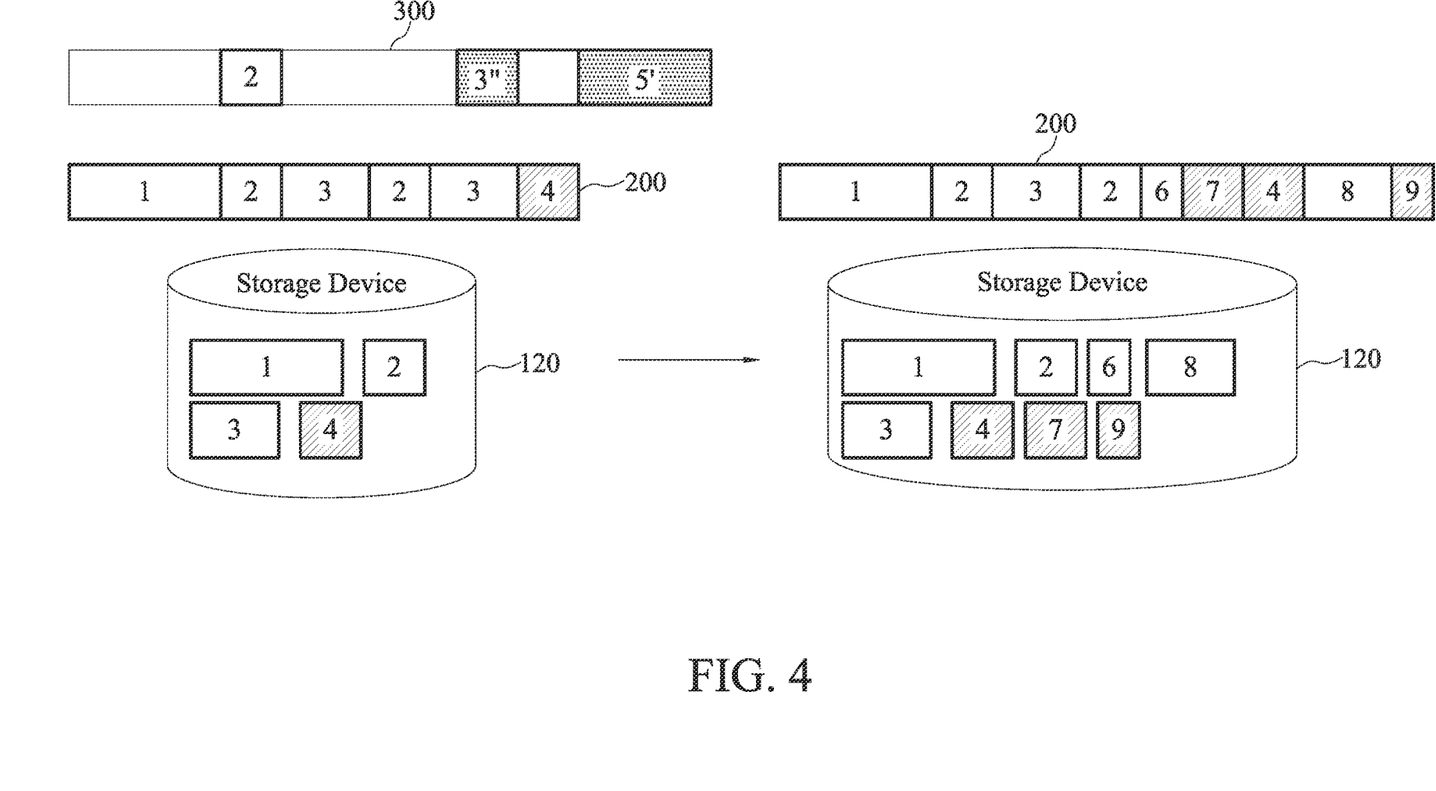
FIG. 4 and FIG. 5 are schematic views of re-chunking and deduplicating of modified chunks according to different embodiments of the present disclosure.

FIG. 4 is a schematic view of re-chunking and deduplicating of modified chunks according to an embodiment of the present disclosure, where the left diagram shows the re-chunking and before deduplicating of the file 200, and the right diagram shows the re-chunking and after deduplicating of the file 200.

In an embodiment, the chunks in the file are divided into three types, namely an unmodified chunk (not marked in the figures), a modified chunk (marked by dots in the figures), and a stub chunk (marked with slashes in the figures). An unmodified chunk refers to a chunk that has not been modified and is not at the end of the file after being obtained from the storage device 120, such as the chunks 1, 2, 3 in the left diagram of FIG. 4. A modified chunk refers to a chunk that has been modified or newly added after being obtained from the storage device 120, such as the chunks 3", 5' in the left diagram of FIG. 4. A stub chunk refers to an end chunk that is generated by the chunking or re-chunking of the file and does not meet the chunking standard of the chunking algorithm, such as the chunks 4, 7, 9 in the left diagram of FIG. 4.

In the left diagram of FIG. 4, a portion of the fifth chunk 3 of the file 200 are modified as a partial chunk 3" in the temporary storage area 300, and a chunk 5' is newly added to the temporary storage area 300. The electronic device 110 determines whether the temporary storage area 300 is dirty according to a preset condition. For example, among all the chunks of the file 200, if the modified portion and the newly added portion have reached or exceeded the preset percentage of the file size of the file 200 (different percentages can be set according to actual requirements, for instance, in an embodiment, the modified and newly added chunks are set to be greater than or equal to 25% of the file size of file 200), the electronic device 110 determines that the temporary storage area 300 is dirty. Alternatively, if the cumulative number of modification and addition of the chunks of the file 200 has reached a preset value (different preset values can be set according to actual requirements), the electronic device 110 determines that the temporary storage area 300 is dirty. When the electronic device 110 determines that the temporary storage area 300 is dirty, the electronic device 110 merges the modified chunk portion 3" in the temporary storage area 300 and the latest version of the remaining portion of the chunk 3 obtained from the storage device 120, and then re-chunks and deduplicates the merged result. In addition, the electronic device 110 also re-chunks and deduplicates the newly added chunk 5'. The result of the aforementioned chunking and deduplicating is shown in the right diagram of FIG. 4, where the fifth chunk 3 of the file 200 is re-chunked into chunks 6 and 7, and the newly added seventh chunk 5' is chunked into chunks 8 and 9. The file 200 before re-chunking has only one stub chunk 4, and the file 200 after re-chunking adds two stub chunks 7 and 9. It can be known from the embodiment in FIG. 4 that every time the file is modified, at least one stub chunk is generated. The content of the stub chunk is usually not easy to duplicate with other chunks, so the added stub chunk reduces the efficiency of deduplication and wastes storage space.

Figure 5:
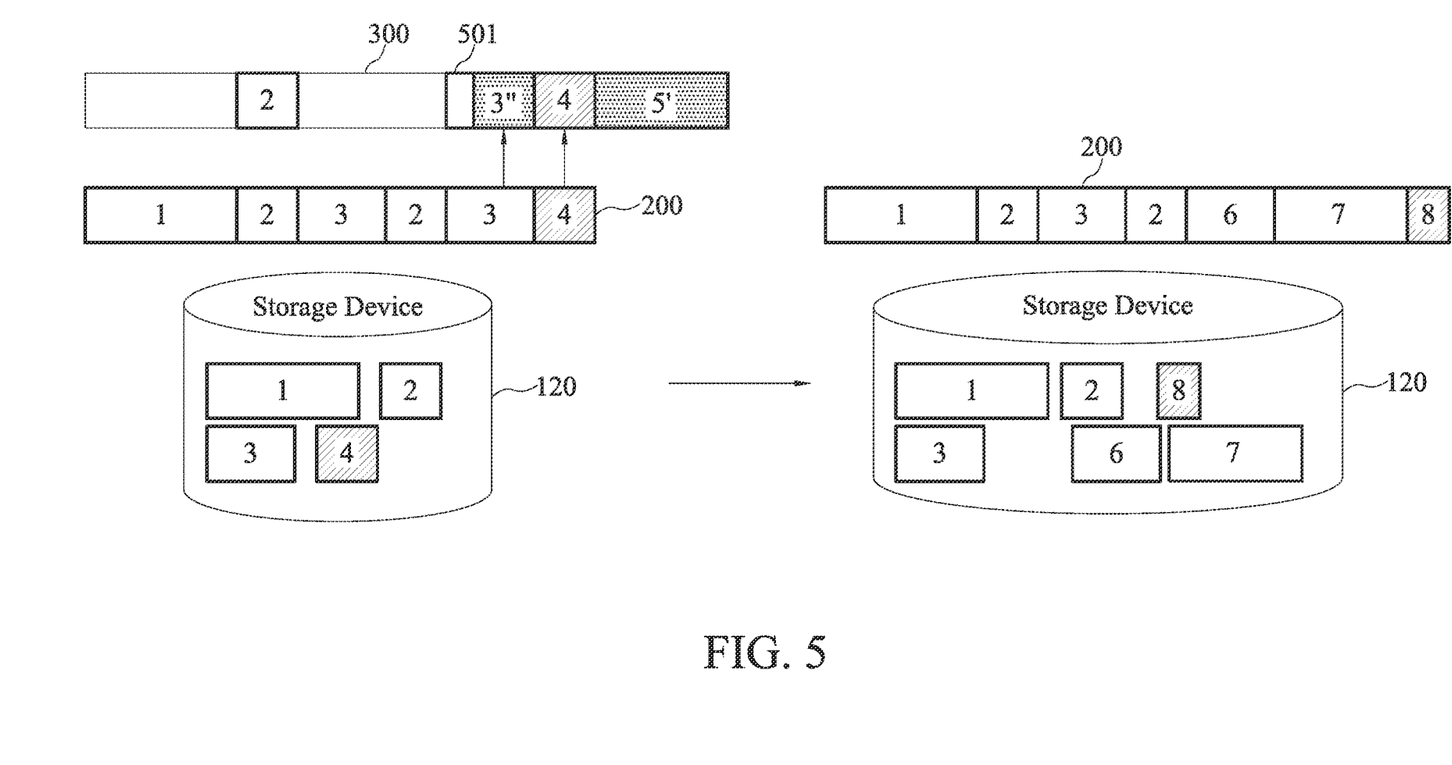

FIG. 5 is a schematic view of re-chunking and deduplicating of modified chunks according to another embodiment of the present disclosure.

First, as shown in the left diagram of FIG. 4, a portion of the fifth chunk 3 of the file 200 are modified as a partial chunk 3" in the temporary storage area 300, and a chunk 5' is newly added to the temporary storage area 300. When the electronic device 110 determines that the temporary storage area 300 is dirty, as shown in the left diagram of FIG. 5, the electronic device 110 obtains the latest version 501 of the remaining portion of the chunk 3 except for the modified portion 3" from the storage device 120, stores the latest version 501 in the temporary storage area 300, and reads the stub chunk 4 between the fifth chunk 3 and the newly added chunk 5' into the temporary storage area 300. Then, the electronic device 110 merges the chunk portions 501, 3" and the chunks 4, 5' into a segment of consecutive data, and then re-chunks and deduplicates the merged consecutive data. The result of which is shown in the right diagram of FIG. 5, where the consecutive data are re-chunked into chunks 6, 7, 8.

In an embodiment, as shown in the left diagram of FIG. 5, the file 200 before re-chunking has only one stub chunk 4; and as shown in the right diagram of FIG. 5, the file 200 after re-chunking still has only one stub chunk 8. Therefore, compared to the method illustrated in FIG. 4, the method illustrated in FIG. 5 is more effective in deduplication and saves storage space, and can prevent the problem of continuously adding stub chunks. The process of FIG. 5 is shown in FIG. 6.

Figure 6:
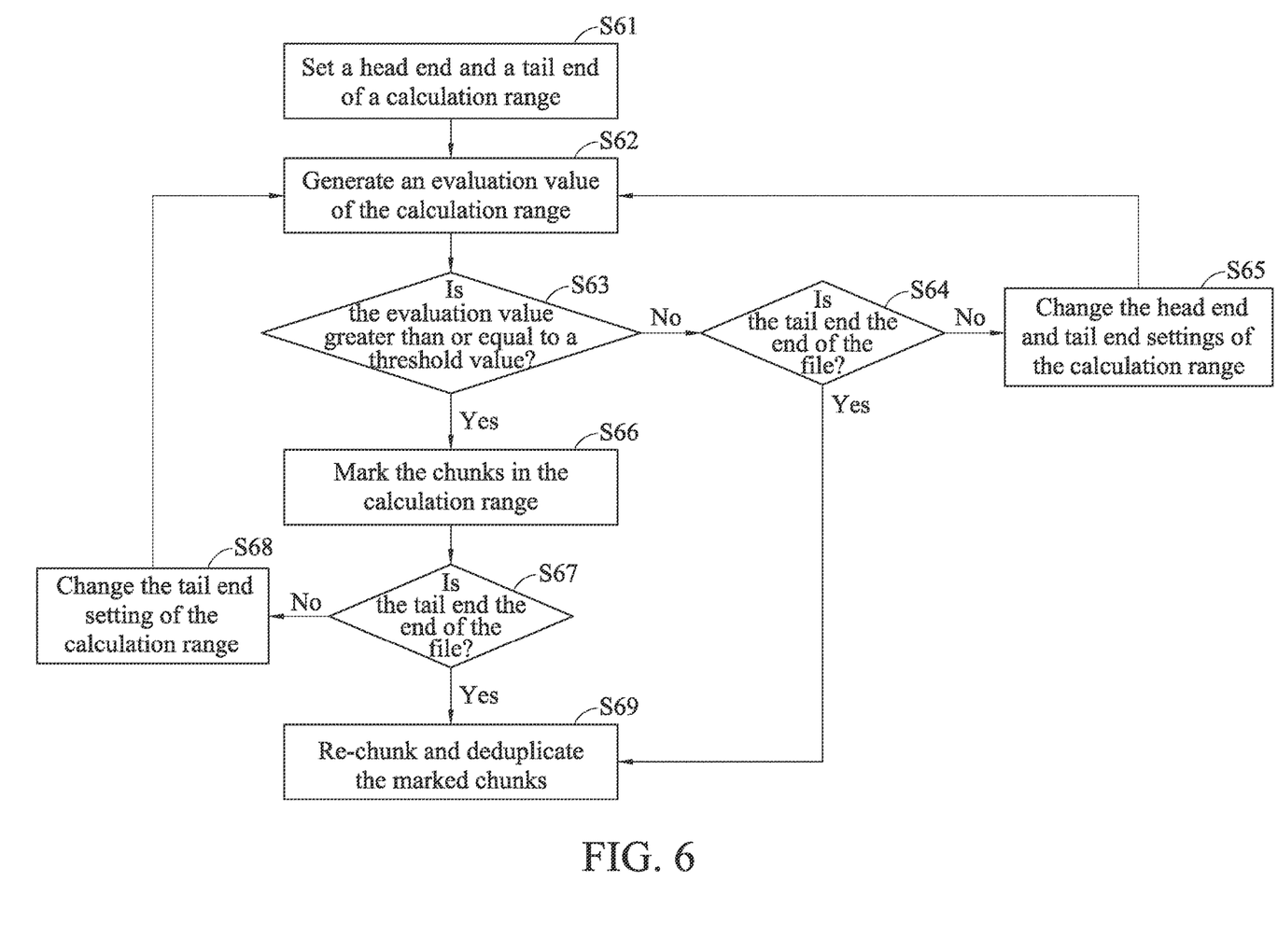
FIG. 6 is a flow chart illustrating a method for deduplication according to an embodiment of the present disclosure.

FIG. 6 is a flow chart illustrating a method for deduplication according to an embodiment of the present disclosure, where the method for deduplication is executed by the electronic device 110. As mentioned above, after a file has been chunked into a plurality of chunks, the plurality of chunks have been deduplicated and the corresponding temporary storage area has become dirty, the electronic device 110 executes the method for deduplication on the file. The following describes the process of the method for deduplication with reference to FIG. 6.

In step S61, set a head end and a tail end of a calculation range in the file according to the types of the chunks in the file so as to define the calculation range. For example, the head end of the calculation range is set to be a first modified chunk or stub chunk in the file, and the tail end of the calculation range is set to be a next modified chunk or stub chunk located after the head end in the file. Further, the calculation range includes all the chunks from the head end to the tail end in the file. Then, proceed to step S62.

In step S62, generate an evaluation value of the calculation range according to the types of the chunks in the calculation range. The evaluation value is generated based on the number and distribution of the modified chunks in the calculation range, and the evaluation value is also generated based on the number of the stub chunks in the calculation range. For instance, the evaluation value is a benefit value of the calculation range divided by a cost value. The benefit value is equal to the number of modified chunks and stub chunks in the calculation range plus the number of consecutive segments of modified chunks. The cost value is the number of all chunks in the calculation range. The aforementioned consecutive segment of the modified chunk is defined as a segment including at least one continuous modified chunk.

Figure 7:
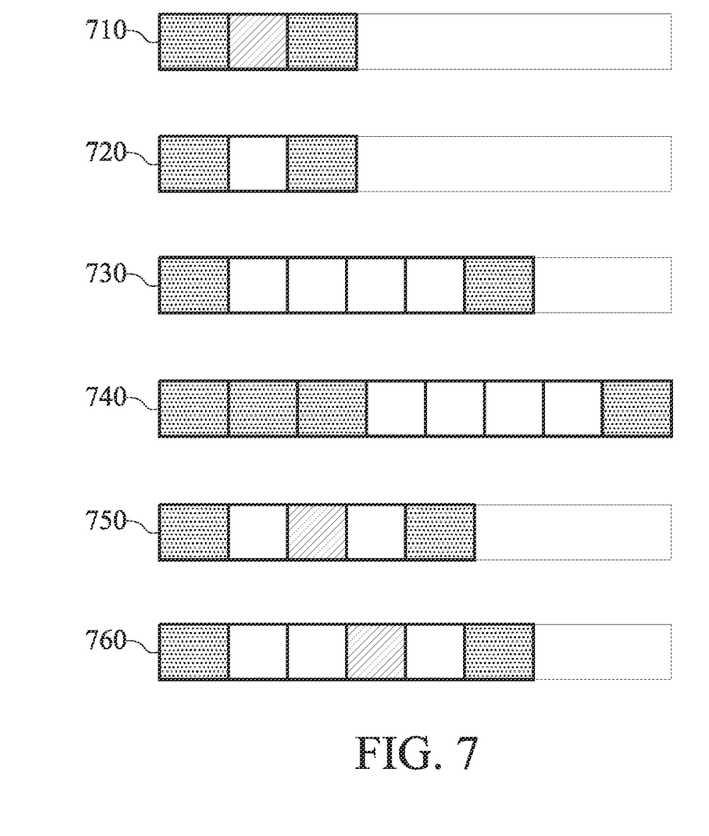
FIG. 7 is a schematic view illustrating a method for deduplication according to an embodiment of the present disclosure.

In an example, in a file 710 of FIG. 7, if a calculation range of the file 710 is from the first chunk to the third chunk, then there are three modified chunks and stub chunks in the calculation range, two consecutive segments of modified chunks in the calculation range (the first chunk and the third chunk, respectively) and three chunks in the calculation range. Therefore, the evaluation value is (2+3)/3=5/3.

In another example, in a file 740 of FIG. 7, if a calculation range of the file 740 is from the first chunk to the eighth chunk, then there are four modified chunks and no stub chunk in the calculation range, two consecutive segments of modified chunks in the calculation range (the first chunk to the third chunk and the eighth chunk, respectively) and eight chunks in the calculation range. Therefore, the evaluation value is (4+2)/8=6/8=3/4.

In yet another example, in a file 760 of FIG. 7, if a calculation range of the file 760 is from the first chunk to the sixth chunk, then there are three modified chunks and stub chunks in the calculation range, two consecutive segments of modified chunks in the calculation range (the first chunk and the sixth chunk, respectively) and six chunks in the calculation range. Therefore, the evaluation value is (3+2)/6=5/6.

Next, in step S63, check whether the evaluation value of the calculation range is greater than or equal to a preset threshold value. In an embodiment, the threshold value is selected in a range greater than 0 and less than or equal to 2. In another embodiment, the threshold value is selected in a range greater than or equal to 0 and less than or equal to 2. If the evaluation value is greater than or equal to the threshold value, the process proceeds to step S66, otherwise the process proceeds to step S64.

In step S64, check whether the tail end of the calculation range is the end of the file. If the tail end is the end of the file, the process proceeds to step S69, otherwise the process proceeds to step S65.

In step S65, change the head end and tail end settings of the calculation range. For instance, the head end is changed to the first modified chunk or stub chunk starting from the tail end in the file (if the tail end is a modified chunk or stub chunk, then the head end is changed and set to the tail end), then the tail end is changed and set to the next modified chunk or stub chunk located after the head end in the file, and the process proceeds back to step S62.

In step S66, mark the chunks in the calculation range, and the process proceeds to step S67.

In step S67, check whether the tail end of the calculation range is the end of the file. If the tail end is the end of the file, the process proceeds to step S69, otherwise the process proceeds to step S68.

In step S68, change the tail end setting of the calculation range. For instance, the tail end is changed and set to the next modified chunk or stub chunk located after the tail end in the file, and the process proceeds back to step S62.

Finally, in step S69, re-chunk and deduplicate the marked chunks in the file. For example, the electronic device 110 first checks whether each modified chunk is completely modified. If there is modified chunk that has not been completely modified, the electronic device 110 obtains the latest version of the remaining portion of the chunk except for the modified portion from the storage device 120, and stores the latest version in the temporary storage area. In addition, if there is marked chunk that has not been stored in the temporary storage area, the electronic device 110 obtains the latest version of the chunk from the storage device 120 and stores the latest version in the temporary storage area. Then, the electronic device 110 merges the marked chunks in the temporary storage area into a segment of consecutive data, re-chunks and deduplicates the merged consecutive data, updates the file descriptor of the file based on the re-chunked and deduplicated merged consecutive data, and updates the chunks stored in the storage device 120.

It should be noted that the selection of the threshold value in step S63 would affect the calculation cost of the method for deduplication and the number of stub chunks. For instance, if the threshold value is set to zero, the range of re-chunking and deduplicating in the file is maximized and the stub chunks are minimized, but the calculation cost is the highest. Further, if the threshold value is set to other values, as the threshold value increases, the number of stub chunks will gradually increase, and the calculation cost will gradually decrease.

An example of the method for deduplication in FIG. 6 is shown in FIG. 7. For the example in FIG. 7, the threshold values are all set to 1.

First, for the file 710, the initial calculation range is set to the first to second chunks, and the evaluation value at this time is 3/2>1, so the first to second chunks are marked. Then, the calculation range is changed and set to the first to third chunks, and the evaluation value at this time is 5/3>1, so the first to third chunks are marked. Finally, the marked first to third chunks are re-chunked and deduplicated.

For the file 720, the initial calculation range is set to the first to third chunks, and the evaluation value at this time is 4/3>1, so the first to third chunks are marked. Finally, the marked first to third chunks are re-chunked and deduplicated.

For the file 730, the initial calculation range is set to the first to sixth chunks, and the evaluation value at this time is 4/6<1, so chunks are not marked. Finally, the chunks of the entire calculation range are not re-chunked and deduplicated, and the modified first chunk and sixth chunk are processed separately in a conventional manner.

For the file 740, the initial calculation range is set to the first to second chunks, and the evaluation value at this time is 3/2>1, so the first to second chunks are marked. Then, the calculation range is changed and set to the first to third chunks, and the evaluation value at this time is 4/3>1, so the first to third chunks are marked. Next, the calculation range is changed and set to the first to eighth chunks, and the evaluation value at this time is 6/8<1, so chunks are not marked. Finally, the marked first to third chunks are re-chunked and deduplicated, and the modified eighth chunk is processed individually in a conventional manner.

For the file 750, the initial calculation range is set to the first to third chunks, and the evaluation value at this time is 3/3=1, so the first to third chunks are marked. Then, the calculation range is changed and set to the first to fifth chunks, and the evaluation value at this time is 5/5=1, so the first to fifth chunks are marked. Finally, the marked first to fifth chunks are re-chunked and deduplicated.

For the file 760, the initial calculation range is set to the first to fourth chunks, and the evaluation value at this time is 3/4<1, so chunks are not marked. Then, the calculation range is changed and set to the fourth to sixth chunks, and the evaluation value at this time is 3/3=1, so the fourth to sixth chunks are marked. Finally, the marked fourth to sixth chunks are re-chunked and deduplicated, and the modified first chunk is processed individually in a conventional manner.

In addition, the present disclosure further provides a computer-readable medium, such as a memory, a magnetic tape, a magnetic disk, an optical disk, or a hard disk. The computer-readable medium stores instructions to execute the aforementioned method for deduplication. The computer-readable medium can be applied in the electronic device 110.

Moreover, the present disclosure further provides a file system, which executes the aforementioned method for deduplication via a processor. The file system can be applied in the electronic device 110.

In summary, the method for deduplication, the computer-readable medium and the file system provided by the present disclosure generate an evaluation value according to the types of the chunks in the file and determine whether to re-chunk and deduplicate the chunks according to the evaluation value. Therefore, re-chunking with poor efficiency can be prevented so as to reduce stub chunks, improve the efficiency of deduplication and save storage space.

The above-described descriptions of the detailed embodiments are to illustrate the preferred implementation according to the present disclosure, and it is not to limit the scope of the present disclosure. Accordingly, all modifications and variations completed by those with ordinary skill in the art should fall within the scope of present disclosure defined by the appended claims.

What is claimed is:

1. A computer-implemented method for deduplication, applicable to a deduplication system comprising an electronic computing device and a remote electronic storage device connected to the electronic computing device via a network, wherein a file is chunked into a plurality of deduplicated chunks stored in the remote electronic storage device, the method comprising:
   providing a temporary storage area, by the electronic computing device, for storing the chunks required by the electronic computing device or modified by the electronic computing device;
   defining a calculation range in the file, by the electronic computing device having the temporary storage area, according to types of the chunks in the file, wherein the calculation range includes a plurality of consecutive chunks in the file;
   generating an evaluation value, by the electronic computing device having the temporary storage area, according to the types of the chunks in the calculation range to determine whether to mark the chunks in the calculation range;
   if there is a marked chunk that has not been stored in the temporary storage area, obtaining a latest version of the marked chunk from the remote electronic storage device and storing the latest version in the temporary storage area;
   re-chunking and deduplicating the marked chunks in the temporary storage area; and
   updating a file descriptor of the file and the deduplicated chunks of the file stored in the remote electronic storage device according to a result of the re-chunking and the deduplicating of the marked chunks in the temporary storage area.

2. The method of claim 1, wherein the chunks of the file have a plurality of different lengths, and the types of the chunks of the file include an unmodified chunk, a modified chunk and a stub chunk.

3. The method of claim 2, wherein defining the calculation range includes:
   setting a head end of the calculation range as a first modified chunk or a first stub chunk in the file; and
   setting a tail end of the calculation range to be a next modified chunk or a next stub chunk located after the head end in the file, wherein the calculation range includes the plurality of consecutive chunks from the head end to the tail end in the file.

4. The method of claim 3, further comprising:
   changing and setting the tail end to a next modified chunk or a next stub chunk located after the tail end in the file if the evaluation value is greater than or equal to a threshold value, and recalculating to generate the evaluation value to determine whether to mark the chunks in the calculation range.

5. The method of claim 3, further comprising:
   changing and setting the head end to a first modified chunk or a first stub chunk from the tail end in the file if the evaluation value is less than a threshold value, changing and setting the tail end to a next modified chunk or a next stub chunk located after the head end in the file, and recalculating to generate the evaluation value to determine whether to mark the chunks in the calculation range.

6. The method of claim 1, wherein determining whether to mark the chunks in the calculation range includes:
   marking the chunks in the calculation range if the evaluation value is greater than or equal to a threshold value, and not marking the chunks in the calculation range if the evaluation value is less than the threshold value.

7. The method of claim 6, wherein the threshold value is greater than zero and less than or equal to two.

8. The method of claim 6, wherein the threshold value is greater than or equal to zero and less than or equal to two.

9. The method of claim 1, wherein the evaluation value is generated according to number and distribution of modified chunks in the calculation range, and the evaluation value is generated according to number of stub chunks in the calculation range.

10. The method of claim 9, wherein the evaluation value is equal to a benefit value divided by a cost value, wherein the benefit value is equal to number of the modified chunks and the stub chunks in the calculation range plus number of consecutive segments of the modified chunks, and wherein the cost value is number of all the chunks in the calculation range.

11. A non-transitory computer-readable storage medium having computer readable program code embodied therein that performs a method for deduplication applicable to a deduplication system comprising an electronic computing device and a remote electronic storage device connected to the electronic computing device via a network, wherein a file is chunked into a plurality of deduplicated chunks stored in the remote electronic storage device, the method comprising:

provide a temporary storage area, by the electronic computing device, for storing the chunks required by the electronic computing device or modified by the electronic computing device;

defining a calculation range in the file, by the electronic computing device having the temporary storage area, according to types of the chunks in the file, wherein the calculation range includes a plurality of consecutive chunks in the file;

generating an evaluation value, by the electronic computing device having the temporary storage area, according to the types of the chunks in the calculation range to determine whether to mark the chunks in the calculation range;

if there is a marked chunk that has not been stored in the temporary storage area, obtaining a latest version of the marked chunk from the remote electronic storage device and storing the latest version in the temporary storage area;

re-chunking and deduplicating the marked chunks in the temporary storage area; and updating a file descriptor of the file and/or the deduplicated chunks of the file stored in the remote electronic storage device according to a result of the re-chunking and the deduplicating of the marked chunks in the temporary storage area.

12. The non-transitory computer-readable storage medium of claim 11, wherein the chunks of the file have a plurality of different lengths, and the types of the chunks of the file include an unmodified chunk, a modified chunk and a stub chunk.

13. The non-transitory computer-readable storage medium of claim 11, wherein determining whether to mark the chunks in the calculation range includes:

marking the chunks in the calculation range if the evaluation value is greater than or equal to a threshold value, and not marking the chunks in the calculation range if the evaluation value is less than the threshold value.

14. The non-transitory computer-readable storage medium of claim 11, wherein the evaluation value is generated according to number and distribution of modified chunks in the calculation range, and the evaluation value is generated according to number of stub chunks in the calculation range.

15. A deduplication system comprising:
an electronic computing device; and
a remote electronic storage device connected to the electronic computing device via a network, wherein a file is chunked into a plurality of deduplicated chunks stored in the remote electronic storage device, and
wherein the electronic computing device reads the file to perform a method, the method comprising:

providing a temporary storage area, by the electronic computing device, for storing the chunks required by the electronic computing device or modified by the electronic computing device;

defining a calculation range in the file, by the electronic computing device having the temporary storage area, according to types of the chunks in the file, wherein the calculation range includes a plurality of consecutive chunks in the file;

generating an evaluation value, by the electronic computing device having the temporary storage area, according to the types of the chunks in the calculation range to determine whether to mark the chunks in the calculation range;

if there is a marked chunk that has not been stored in the temporary storage area, obtaining a latest version of the marked chunk from the remote electronic storage device and storing the latest version in the temporary storage area:

re-chunking and deduplicating the marked chunks in the temporary storage area; and updating a file descriptor of the file and the deduplicated chunks of the file stored in the remote electronic storage device according to a result of the re-chunking and the deduplicating of the marked chunks in the temporary storage area.

16. The deduplication system of claim 15, wherein the chunks of the file have a plurality of different lengths, and the types of the chunks of the file include an unmodified chunk, a modified chunk and a stub chunk.

17. The deduplication system of claim 15, wherein determining whether to mark the chunks in the calculation range includes:

marking the chunks in the calculation range if the evaluation value is greater than or equal to a threshold value, and not marking the chunks in the calculation range if the evaluation value is less than the threshold value.

18. The deduplication system of claim 15, wherein the evaluation value is generated according to number and distribution of modified chunks in the calculation range, and the evaluation value is generated according to number of stub chunks in the calculation range.

* * * * *